(12) United States Patent
Gilreath

(10) Patent No.: US 8,226,093 B1
(45) Date of Patent: Jul. 24, 2012

(54) TRASH CONTAINER AND SUPPORT COMBINATION

(76) Inventor: William Anthony Gilreath, Williamston, SC (US)

( * ) Notice: Subject to any disclaimer, the term of this patent is extended or adjusted under 35 U.S.C. 154(b) by 0 days.

(21) Appl. No.: 13/084,714

(22) Filed: Apr. 12, 2011

(51) Int. Cl.
   *B62B 1/00* (2006.01)
(52) U.S. Cl. .................. 280/47.29; 280/47.26; 220/908
(58) Field of Classification Search ........ 280/79.5–79.6, 280/47.17, 47.19, 47.131, 47.16, 47.24, 47.26, 280/47.34, 79.11, 79.7, 47.371, 655.1, 639; D34/23–26, 5, 39; 248/128–129; 220/23.83, 220/23.86, 23.87, 23.91, 908
See application file for complete search history.

(56) References Cited

U.S. PATENT DOCUMENTS

| | | | | |
|---|---|---|---|---|
| 2,650,786 A * | 9/1953 | Platt | | 410/51 |
| 2,667,320 A * | 1/1954 | Whitley | | 248/147 |
| 2,745,676 A * | 5/1956 | Scott | | 280/47.26 |
| 2,802,673 A * | 8/1957 | Hazlett | | 280/47.24 |
| 2,904,345 A * | 9/1959 | Bradley | | 280/47.131 |
| 2,940,707 A * | 6/1960 | Bland et al. | | 248/129 |
| 2,998,218 A * | 8/1961 | Elward | | 248/129 |
| 3,188,109 A * | 6/1965 | Broadrick | | 280/47.26 |
| 3,214,120 A * | 10/1965 | McKee | | 248/129 |
| 3,224,595 A * | 12/1965 | Sherley | | 211/83 |
| 3,281,159 A * | 10/1966 | Levy | | 280/47.26 |
| 3,479,047 A | 11/1969 | Bailey | | |
| 3,655,158 A * | 4/1972 | Smith, Jr. | | 248/154 |
| 3,893,699 A * | 7/1975 | Morris | | 280/659 |
| 5,035,438 A * | 7/1991 | Cronquist | | 280/79.5 |
| 5,354,023 A * | 10/1994 | Meeks | | 248/129 |
| 5,423,448 A | 6/1995 | Pedigo | | |
| 5,445,398 A * | 8/1995 | Pierce | | 280/47.26 |
| 5,860,659 A | 1/1999 | Hart | | |
| 6,131,861 A * | 10/2000 | Fortier et al. | | 248/98 |
| 6,311,859 B1 * | 11/2001 | Haas | | 220/4.22 |
| 6,367,822 B1 * | 4/2002 | Hutchins | | 280/47.24 |
| 6,651,992 B1 * | 11/2003 | Smith, Sr. | | 280/47.26 |
| 7,101,142 B2 | 9/2006 | Bik et al. | | |
| 7,168,714 B2 * | 1/2007 | Gibbs | | 280/47.34 |
| D573,768 S | 7/2008 | Tuncel | | |
| 7,740,251 B2 * | 6/2010 | Simmons | | 280/47.27 |
| 7,762,418 B1 * | 7/2010 | Natale | | 220/23.87 |
| 2008/0023480 A1 * | 1/2008 | Fisher | | 220/495.06 |
| 2008/0264949 A1 | 10/2008 | Hume | | |
| 2010/0219191 A1 * | 9/2010 | Prosa | | 220/495.06 |
| 2010/0225078 A1 * | 9/2010 | Bragg | | 280/47.26 |

* cited by examiner

*Primary Examiner* — John Walters
*Assistant Examiner* — James Triggs

(57) ABSTRACT

A trash container and support combination includes a waste receptacle with a bottom wall and a perimeter wall attached to and extending upwardly from the bottom wall. A cover is removably positioned on the perimeter wall to selectively open or close the waste receptacle. A frame for receiving the waste receptacle includes a bottom portion abutted against the bottom wall and supporting the bottom wall above a ground surface. An upper portion is attached to and extends upwardly from the bottom portion. The upper portion completely extends around the perimeter wall.

17 Claims, 5 Drawing Sheets

TRASH CONTAINER AND SUPPORT COMBINATION

BACKGROUND OF THE DISCLOSURE

Field of the Disclosure

The disclosure relates to trash container bracing devices and more particularly pertains to a new trash container bracing device for supporting a trash can and allowing for the trash can to be lifted mechanically.

SUMMARY OF THE DISCLOSURE

An embodiment of the disclosure meets the needs presented above by generally comprising a waste receptacle that includes a bottom wall and a perimeter wall attached to and extending upwardly from the bottom wall. A cover is removably positioned on the perimeter wall to selectively open or close the waste receptacle. A frame is configured to receive the waste receptacle and includes a bottom portion configured for being abutted against the bottom wall and supporting the bottom wall above a ground surface. An upper portion is attached to and extends upwardly from the bottom portion. The upper portion is configured to completely extend around the perimeter wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
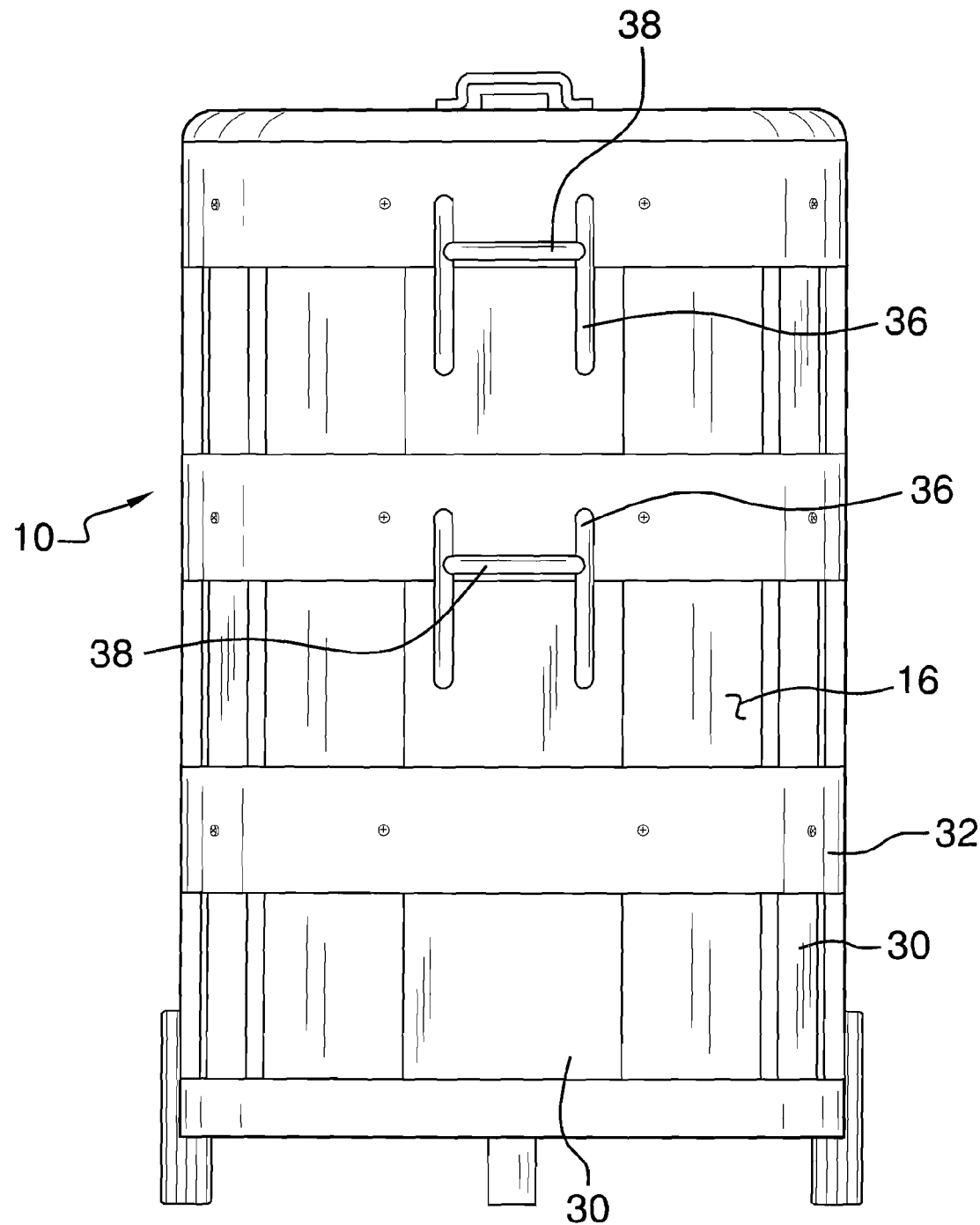
FIG. 1 is a front view of a trash container and support combination according to an embodiment of the disclosure.
Figure 2:
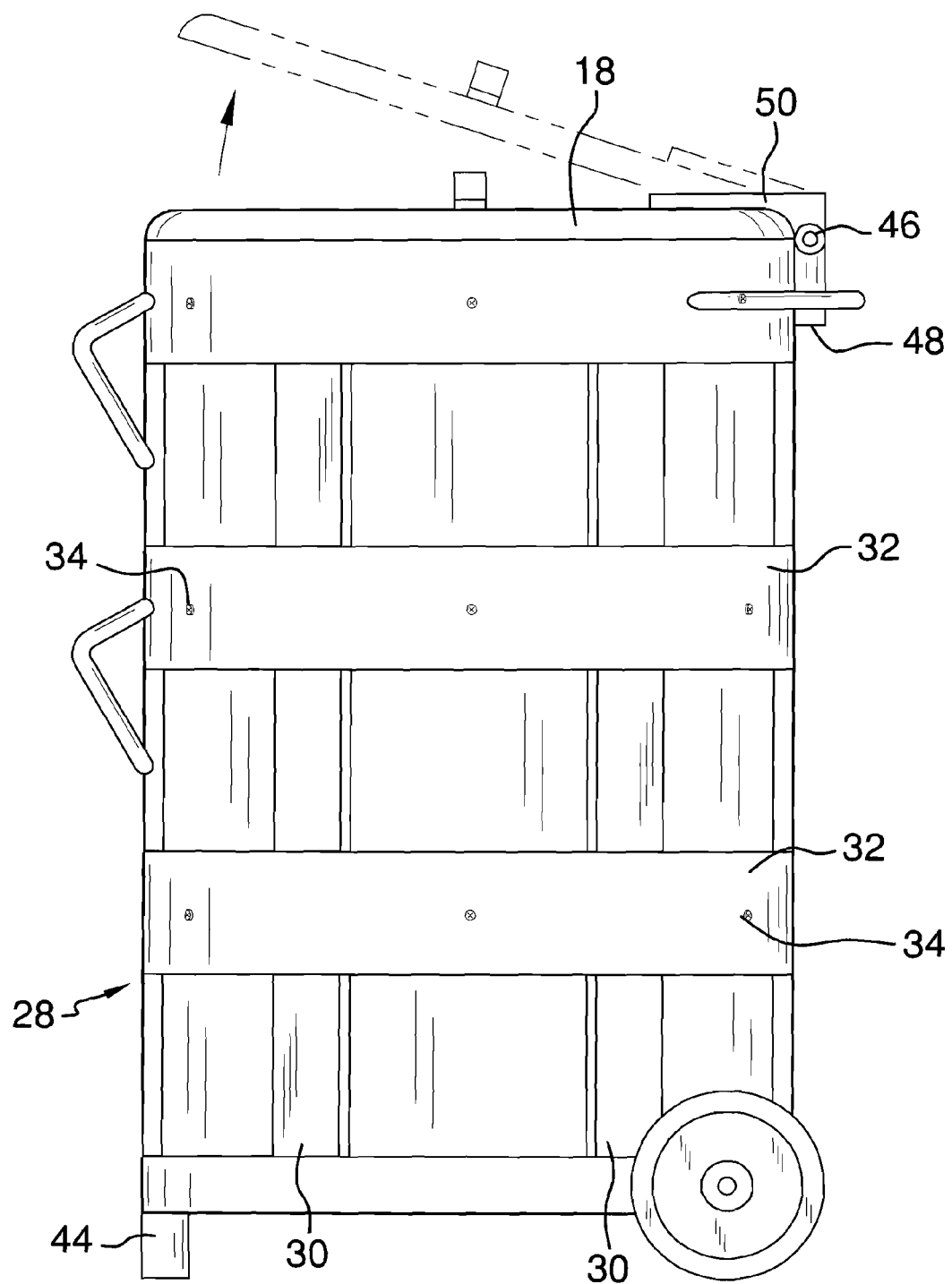
FIG. 2 is a side view of an embodiment of the disclosure.
Figure 3:
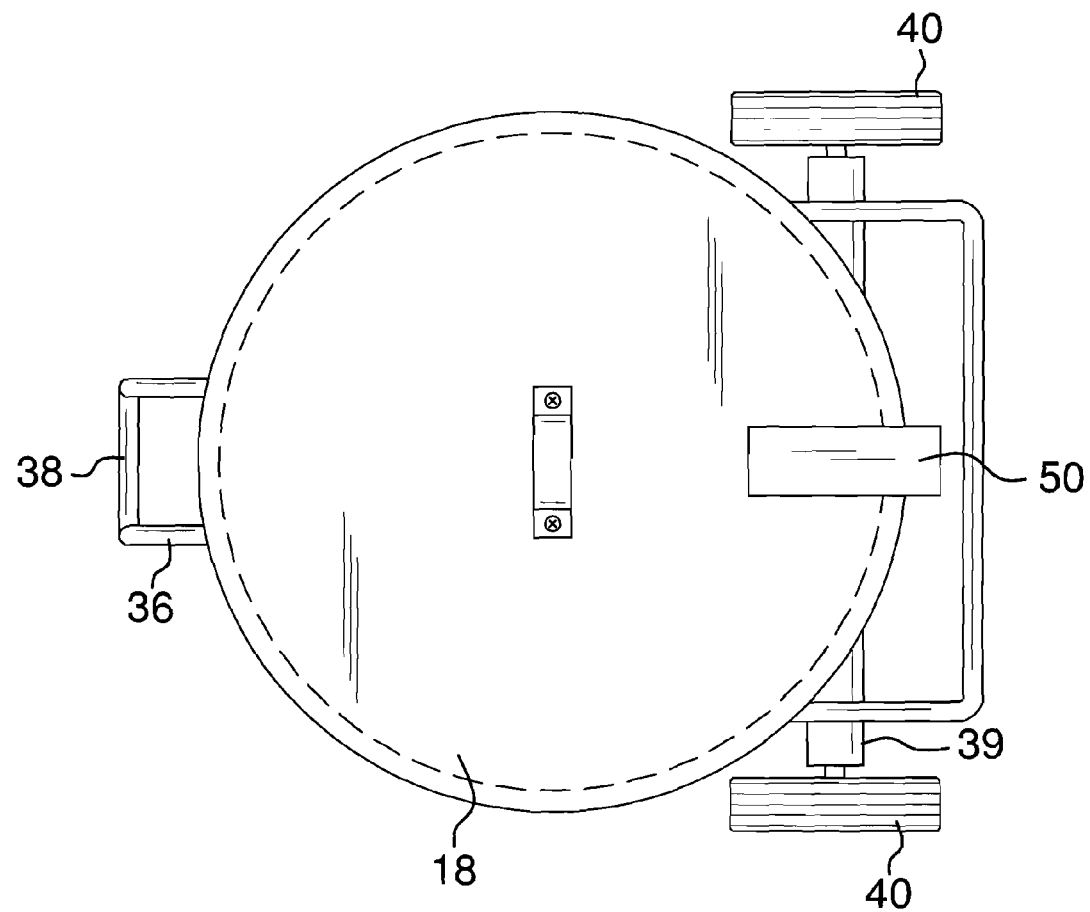
FIG. 3 is a top view of an embodiment of the disclosure.
Figure 4:
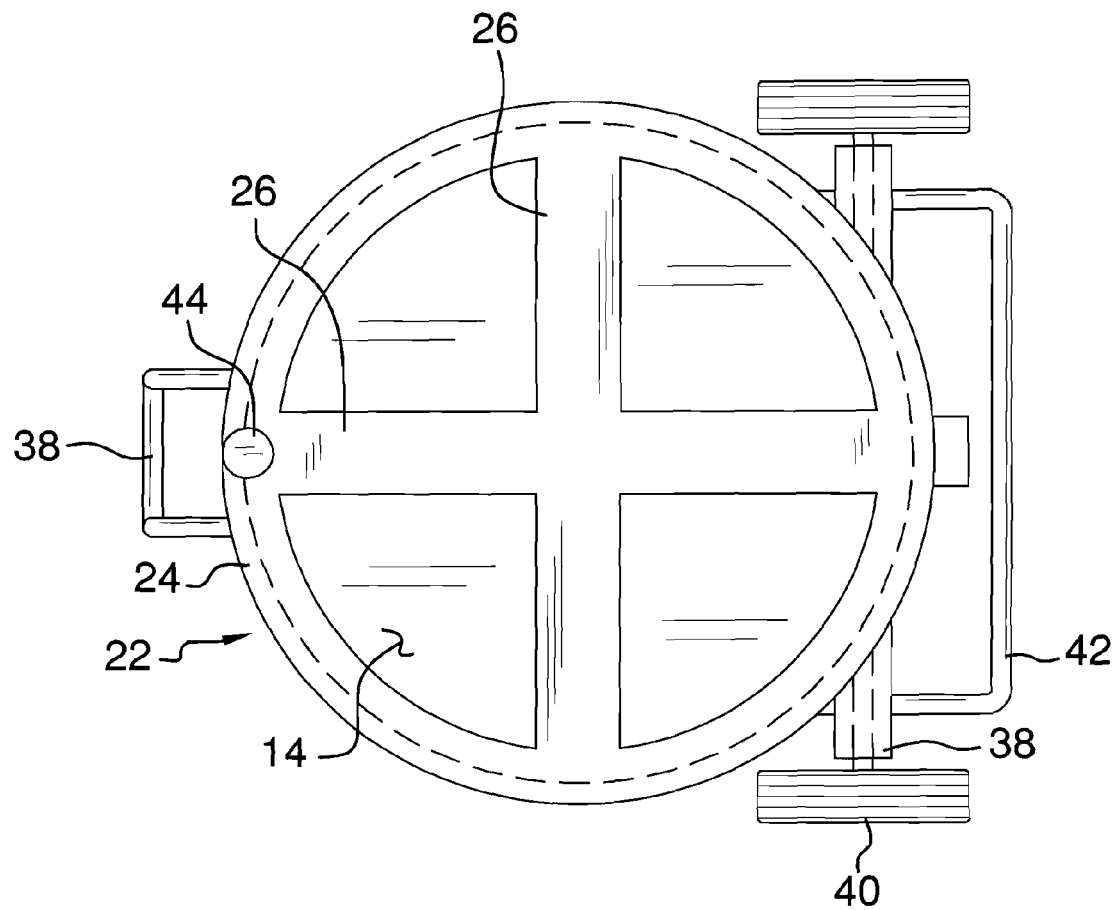
FIG. 4 is a bottom view of an embodiment of the disclosure.
Figure 5:
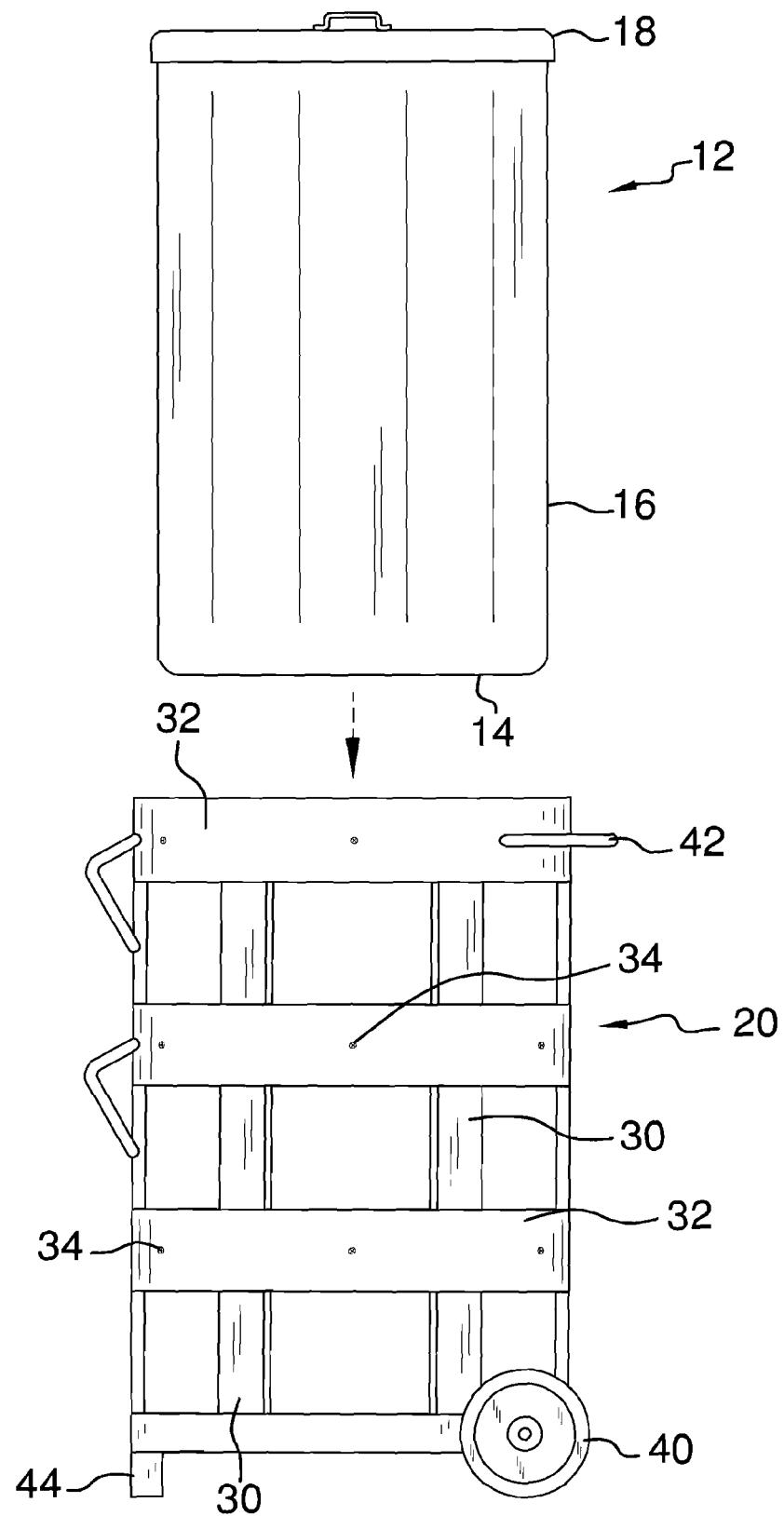
FIG. 5 is a side view of an embodiment of the disclosure.

With reference now to the drawings, and in particular to FIGS. 1 through 5 thereof, a new trash container bracing device embodying the principles and concepts of an embodiment of the disclosure and generally designated by the reference numeral 10 will be described.

As best illustrated in FIGS. 1 through 5, the trash container and support combination 10 generally comprises a waste receptacle 12 that includes a bottom wall 14 and a perimeter wall 16 attached to and extending upwardly from the bottom wall 14. A cover 18 is removable positionable on the perimeter wall 16 to selectively open or close the waste receptacle 12. The waste receptacle 12 is generally conventional.

A frame 20 is configured to receive the waste receptacle 12. The frame 20 includes a bottom portion 22 configured for being abutted against the bottom wall 14 and supporting the bottom wall 14 above a ground surface. The bottom portion 22 includes an outer support 24 and a plurality of inner supports 26 that are attached to the outer support 24. The inner supports 26 traverse an opening being bounded by the outer support 24. An upper portion 28 is attached to and extends upwardly from the bottom portion 22. The upper portion 28 is configured to completely extend around the perimeter wall 16. The upper portion 28 includes a plurality of stanchions 30 attached to and extending upwardly from the outer support 24. The stanchions 30 are spaced from each other. A plurality of bands 32 is attached to each of the stanchions 30 and each of the bands 32 is horizontally orientated and is spaced from each other. The upper portion 28 has a height equal to within 6.0 cm of a height of the perimeter wall 16. A plurality of fasteners 34 may be extended through the frame and into the waste receptacle.

A pair of grips 36 is attached to and extends outwardly from the upper portion 28. The grips 36 are vertically aligned with each other such that one of the grips 36 is positioned directly above the other one of the grips. Each of the grips 36 includes a horizontally orientated rod 38 which allows the grips 36 to be configured to be gripped by a trash lifting apparatus. In this manner, the frame 20 and waste receptacle 12 therein can be lifted by garbage truck and prevent the injury to the collector.

An axle 39 is attached to the bottom portion 22 and a pair of wheels 40 is rotatably coupled to the axle 39 to allow the frame 20 to be more easily maneuvered as needed. A handle 42 is attached to the upper portion 28 and is positioned above the axle 39. A vertical support 44 is attached to the bottom portion 22 and extends downwardly from the bottom portion 22. The vertical support 44 is spaced from the wheels 40 and extends downwardly from the bottom portion 22 a distance approximately equal to a distance the wheels 40 extend downwardly away from the bottom portion 22 to prevent the frame 20 from tipping over. This structure will also better support the waste receptacle 12 and prevent it from easily falling over.

A hinge 46 is provided that includes a first plate 48 and a second plate 50 pivotally coupled to each other. The first plate 48 is attached to an uppermost one of the bands 32, while the second plate 50 is attached to the cover 18. The hinge 46 is positioned opposite of the grips 36 and prevents the cover 18 from falling away from the receptacle 12 but the cover 18 will open when the frame 20 and receptacle 12 are overturned.

In use, the receptacle 12 is put in the frame 20 and will allow for easier lifting of the receptacle 12. However, the frame 20 will additionally provide structural support for the receptacle 12 to prevent the receptacle 12 from cracking or breaking, particularly in cold temperatures, when it is being physically manipulated.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A trash receiving assembly and support combination comprising:
   a waste receptacle including a bottom wall and a perimeter wall being attached to and extending upwardly from said bottom wall, a cover being removably positioned on said perimeter wall to selectively open or close said waste receptacle;
   a frame configured to receive said waste receptacle, said frame including;
      a bottom portion configured for being abutted against said bottom wall and supporting said bottom wall above a ground surface;
      an upper portion being attached to and extending upwardly from said bottom portion, said upper portion being configured to completely extend around said perimeter wall;
   said bottom portion including an outer support and a plurality of inner supports being attached to said outer support, said inner supports traversing an opening being bounded by said outer support; and
   said upper portion including a plurality of stanchions being attached to and extending upwardly from said outer support, said stanchions being spaced from each other, a plurality of bands being attached to each of said stanchions, each of said bands being horizontally orientated and being spaced from each other.

2. The combination according to claim 1, further including a pair of grips being attached to and extending outwardly from said upper portion, said grips being vertically aligned with each other.

3. The combination according to claim 2, wherein each of said grips includes a horizontally orientated rod configured to be gripped by a trash lifting apparatus.

4. The combination according to claim 1, further including an axle being attached to said bottom portion, a pair of wheels being rotatably coupled to said axle.

5. The combination according to claim 4, further including a handle being attached to said upper portion and being positioned above said axle.

6. The combination according to claim 4, further including a vertical support being attached to said bottom portion and extending downwardly from said bottom portion, said vertical support being spaced from said wheels.

7. The combination according to claim 1, further including a hinge hingedly coupling said upper portion to said cover.

8. The combination according to claim 1, further including a plurality of fasteners, said fasteners extending through said frame and into said waste receptacle.

9. A trash receiving assembly and support combination comprising:
   a waste receptacle including a bottom wall and a perimeter wall being attached to and extending upwardly from said bottom wall, a cover being removably positioned on said perimeter wall to selectively open or close said waste receptacle;
   a frame configured to receive said waste receptacle, said frame including;
      a bottom portion configured for being abutted against said bottom wall and supporting said bottom wall above a ground surface;
      an upper portion being attached to and extending upwardly from said bottom portion, said upper portion being configured to completely extend around said perimeter wall;
   said bottom portion including an outer support and a plurality of inner supports being attached to said outer support, said inner supports traversing an opening being bounded by said outer support;
   said upper portion including a plurality of stanchions being attached to and extending upwardly from said outer support, said stanchions being spaced from each other, a plurality of bands being attached to each of said stanchions, each of said bands being horizontally orientated and being spaced from each other;
   a pair of grips being attached to and extending outwardly from said upper portion, said grips being vertically aligned with each other, each of said grips including a horizontally orientated rod configured to be gripped by a trash lifting apparatus;
   an axle being attached to said bottom portion, a pair of wheels being rotatably coupled to said axle;
   a handle being attached to said upper portion and being positioned above said axle;
   a vertical support being attached to said bottom portion and extending downwardly from said bottom portion, said vertical support being spaced from said wheels and extending downwardly from said bottom portion a distance approximately equal to a distance said wheels extend downwardly away from said bottom portion;
   a hinge including a first plate and a second plate pivotally coupled to each other, said first plate being attached to an uppermost one of said bands, said second plate being attached to said cover, said hinge being positioned opposite of said grips; and
   a plurality of fasteners, said fasteners extending through said frame and into said waste receptacle.

10. A waste receptacle support assembly comprising:
    a frame configured to receive said waste receptacle, said frame including;
       a bottom portion configured for being abutted against a bottom wall of the waste receptacle and supporting said bottom wall above a ground surface;
       an upper portion being attached to and extending upwardly from said bottom portion, said upper portion being configured to completely extend around a perimeter wall of said waste receptacle;
    said bottom portion including an outer support and a plurality of inner supports being attached to said outer support, said inner supports traversing an opening being bounded by said outer support; and
    said upper portion including a plurality of stanchions being attached to and extending upwardly from said outer support, said stanchions being spaced from each other, a plurality of bands being attached to each of said stanchions, each of said bands being horizontally orientated and being spaced from each other.

11. The combination according to claim 10, further including a pair of grips being attached to and extending outwardly from said upper portion, said grips being vertically aligned with each other.

12. The combination according to claim 11, wherein each of said grips includes a horizontally orientated rod configured to be gripped by a trash lifting apparatus.

13. The combination according to claim 10, further including an axle being attached to said bottom portion, a pair of wheels being rotatably coupled to said axle.

14. The combination according to claim 13, further including a handle being attached to said upper portion and being positioned above said axle.

15. The combination according to claim 13, further including a vertical support being attached to said bottom portion and extending downwardly from said bottom portion, said vertical support being spaced from said wheels.

16. The combination according to claim 10, further including a hinge being configured to hingedly couple said upper portion to said cover.

17. The combination according to claim 10, further including a plurality of fasteners, said fasteners being configured to be extended through said frame and into said waste receptacle.

* * * * *